United States Patent [19]

Gratzmuller

[11] 3,965,317
[45] June 22, 1976

[54] APPARATUS FOR INDICATING CYLINDER FLUID LEVEL

[76] Inventor: Jean Louis Gratzmuller, 66 Blvd. Maurice Barres, Neuilly-sur-Seine, France, 92200

[22] Filed: July 3, 1974

[21] Appl. No.: 485,323

[30] Foreign Application Priority Data
July 4, 1973 France .............................. 73.24526

[52] U.S. Cl. .................. 200/82 E; 200/81.9 M; 340/240
[51] Int. Cl.² ................................. H01H 35/38
[58] Field of Search ........... 335/205, 206; 200/82 E, 200/82 R, 81.9 M, 83 L, DIG. 14, 84 C; 340/229, 240, 242; 116/70; 73/40, 47

[56] References Cited
UNITED STATES PATENTS

| 3,042,771 | 7/1962 | Oliveau | 200/83 L |
|---|---|---|---|
| 3,098,500 | 7/1963 | Gruber | 200/82 E |
| 3,113,189 | 12/1963 | Parwancher | 200/81.9 M |
| 3,327,079 | 6/1967 | Widl | 200/82 E |
| 3,366,758 | 1/1968 | Bentzen et al. | 200/82 E |
| 3,510,607 | 5/1970 | Breed et al. | 200/81.9 M |
| 3,611,220 | 10/1971 | Hoffman | 200/82 E |

FOREIGN PATENTS OR APPLICATIONS
645,192  7/1962  Canada ........................ 200/81.9 M

OTHER PUBLICATIONS
Multiconfiguration Pressure Switch, Bolan, vol. 8, No. 7, Dec. 65, p. 954.

*Primary Examiner*—Gerald P. Tolin
*Attorney, Agent, or Firm*—Ellsworth R. Roston

[57] ABSTRACT

A hydro-pneumatic accumulator of the type in which a piston slidable within a cylinder separates a liquid and a gas under pressure, is provided with an end closure of a non-magnetic material within which closure is provided a magnetically actuated switch. Movement of the piston causes a permanent magnet to be moved relative to the switch whereby movement of the magnet into the actuating range of the switch causes the switch to be actuated and an indication of the level of the liquid in the accumulator to be provided.

13 Claims, 4 Drawing Figures

APPARATUS FOR INDICATING CYLINDER FLUID LEVEL

This invention relates to piston-type hydro-pneumatic accumulators.

It is known that these devices consist in a cylinder closed by two end closures and divided into two chambers by a free piston; one chamber containing a gas under pressure and the other a fluid, usually oil. These devices are used as a reserve of fluid under pressure in order to operate actuating components such as jacks, the accumulator being replenished with fluid by a pump, according to consumption.

The operation of these devices is started by inflating the gas chamber with an inert gas to a given pressure called "pre-inflation pressure" and it is this elastic cushion of gas which then maintains the pressure of the fluid and which constitutes the elastic reserve of power the device can provide.

In some conditions of use it is useful to known the position of the free piston inside the cylinder during the operation of the accumulator, thus enabling the quantity of oil available and the volume of the gas to be determined. It is thus possible for instance to start the fluid replenishment pump and ensure that the volume of gas remaining is sufficient. Until now, in order to provide a check of the position of the free piston, accumulators with an "extending rod" were used; that is to say, a rod attached to the free piston and protruding through one of the cylinder end closures. There are two disadvantages in this arrangement: it requires additional sealing where the rod passes through the closure, which could be a source of leaks, and it increases the overall dimensions of the device.

In practice, it is particularly important to known the position of the free piston when it approaches one or the other end of its normal travel; that is to say, if the piston approaches the end of the gas chamber, passing a predetermined point, this means that there has been a loss of inflation (and therefore that a leakage must be rectified or the accumulator must be re-inflated), whereas, if the piston approaches too close to the end of the fluid chamber, this means that the fluid level is low (either due to a leak or to normal consumption).

This invention allows such a check of the position of the piston in an accumulator without the need for additional sealing or for an increase in the overall dimensions of the device.

In this invention, the monitoring of the position of the piston is achieved by means of a permanent magnet system in which a permanent magnet is moved by the piston over at least part of the latter's travel and operates a magnetically controlled electric switch.

The monitoring of the level of a hydro-pneumatic accumulator by means of the movement of a permanent magnet has already been suggested.

Pages 192 and 193 of an article headed "Hydraulic Accumulators in Heavy Industry" by J.G. FRITH, published in the "Proceedings of the Institution of Mechanical Engineers", Vol 170, 1956, by "The Institution" Birdcage Walk, Westminister, London S.W.1., describe a pistonless hydro-pneumatic accumulator on which a non-magnetic metal checking tube is mounted in parallel, inside which a float, rising and falling with the level of the fluid in the accumulator, carries a permanent magnet operating a magnetically controlled switch. This solution calls for the fitting outside the accumulator of an additional tube able to withstand the operating pressure. This increases the overall dimensions and price of the device.

In addition, French Pat. No. 1,283,618 in the name of VOIGT describes a piston type accumulator, the entire wall of which is made of non-magnetic metal, whereas the piston is made of magnetic metal which, through magnetic effect, moves a magnetic metal ring fitted outside the accumulator around its wall. This solution, which does not seem to have ever been used in practice, any more than the first solution, requires the whole of the pressure resistant barrel of the accumulator to be made of non-magnetic metal. This can be very costly in the case of high pressures (in the region of 200 to 500 kg/cm$^2$ (2844 to 7111 PSI)) at which modern accumulators operate. In addition, the presence of a moving ring outside the accumulator increases the overall dimensions and calls for special precautions in order to achieve the satisfactory guiding and movement of the ring.

The present invention has none of these disadvantages as the accumulator barrel is made of magnetic metal, steel in particular, which can withstand a high working load, as in the construction of the normal accumulators, and this does not increase the cost of manufacture. Moreover, all the magnetic monitoring system is housed within the accumulator so that the overall dimensions are not increased. Finally, the only part which must be made of a magnetic metal (at least part of one of the accumulator cylinder end closures) can be a part working essentially under compression and therefore not requiring any particular increase in size as compared with a steel closure.

The subject of this invention is a piston-type hydro-pneumatic accumulator comprising a cylinder, two cylinder end closures, and a free piston separating the cylinder into a chamber for the fluid and a chamber for the gas, this accumulator being typical in that:

the cylinder is made of magnetic metal; especially of steel, at least one of the end closures is made of a non-magnetic material, a magnetically operated spring leaf switch in a sealed capsule, named "ILS" (Interrupteur a Lames en ampoule Scellee), is housed in the said closure inside a blind hole opening inside the cylinder, that switch being designed so as to close an electrical circuit monitoring the position of the piston, a moving permanent magent is mounted in the cylinder chamber closed by the said closure, linking devices are fitted between the said piston and the said magnet so as to bring the said magnet within operating range of the said switch when the piston approaches the said end closure closer than a pre-determined distance.

By means of this invention, no additional hole has to be made between the outside and inside of the cylinder, the magnet acting by proximity only through the non-magnetic end closure in order to operate the switch, thus deleting any associated sealing problem.

The invention is particularly useful to detect losses of preinflation gas; that is to say that the detection device is fitted on the gas chamber side but it is of course understood that an identical device can be fitted on the fluid chamber side.

In a preferred form of construction, the moving magnet is fitted in a second blind hole made in the non-magnetic closure in the vicinity of the first hole and opening in the cylinder chamber closed by the said closure, the said magnet being movable in the said hole between a first position where it does not operate the switch and a second position where it operates the switch, spring loaded devices being provided to impel the said magnet towards one of its two positions.

The invention will be better understood through the description and drawings which follow and which show various methods of implementing the invention.

Figure 1:
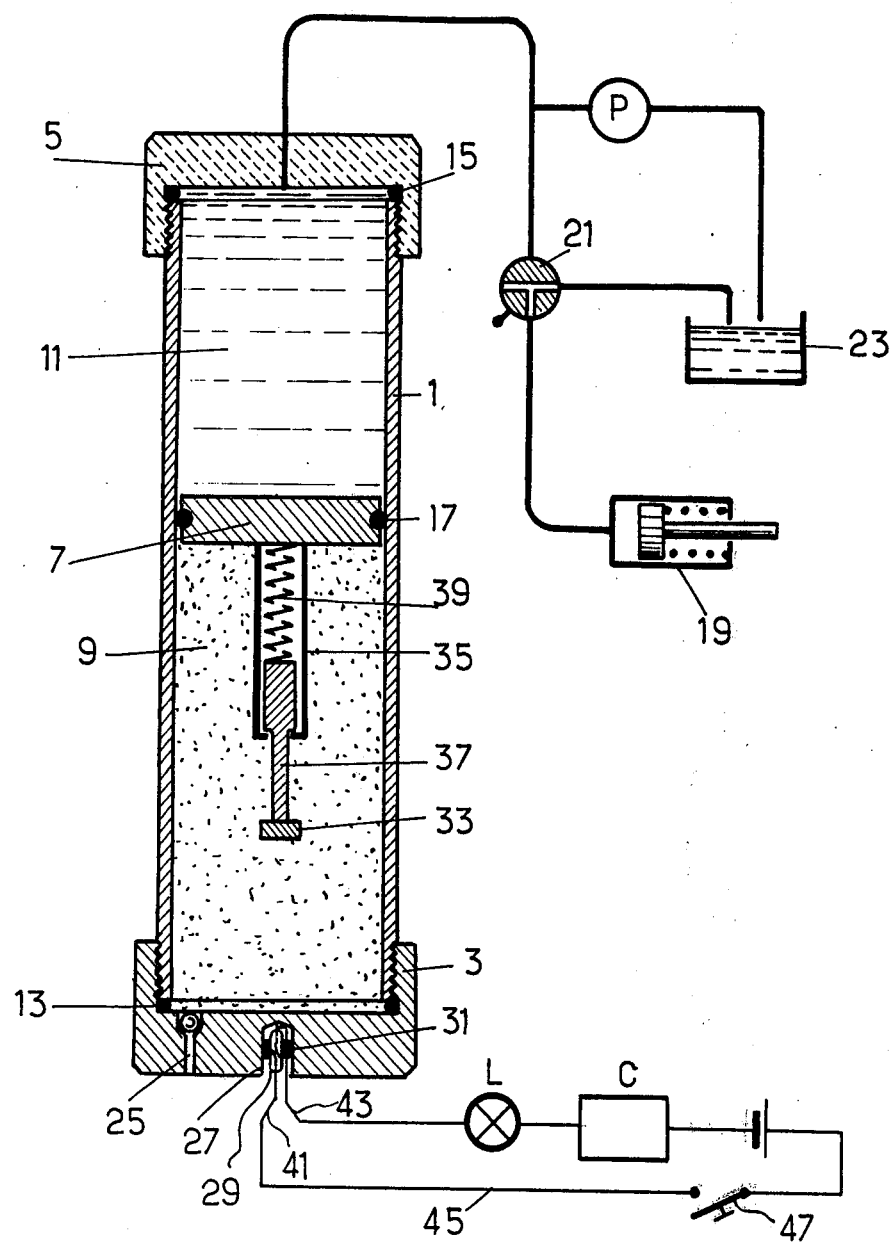
FIG. 1 is a diagrammatic sectional view of an accumulator according to this invention, on which the main parts of the associated hydraulic and electrical systems are shown.

The hydro-pneumatic accumulator represented in FIG. 1 is composed of, as is known, the following essential components: a cylinder 1, two cylinder end closures 3 and 5 and a free piston 7 separating the internal volume of the cylinder into a gas chamber 9 and a fluid chamber (oil for instance) 11. Seals 13, 15, and 17 for the closures and cylinder are shown diagrammatically.

Such an accumulator can be used to supply an actuating device such as a hydraulic jack 19, the supply to and bleeding of which are controlled by a valve 21. A pump P drawing the fluid from a low pressure reservoir 23, the starting and stopping of this pump being usually controlled by a pressure switch, replenishes the fluid chamber 11 periodically and automatically. In closure 3, a valve 25 allows the initial pre-inflation of the accumulator gas under pressure as well as any addition of gas in case of a leakage.

It can be seen how important it is to know in such a device whether the gas content is adequate to cover the operations scheduled, which are often safety operations, such as for instance, jack 19 is the actuator controlling an electrical circuit-breaker.

In FIG. 1 the extreme downwards position of piston 7 indicates the amount of gas under pressure in chamber 9. Obviously, for an identical amount of gas, the extreme position of piston 7 when the pump P replenishes the fluid chamber up to the maximum pressure selected will vary according to the temperature but, nevertheless there will be an indication regarding the amount of gas available.

In this invention, the accumulator cylinder 1 consists of a steel tube, as in normal accumulators not provided with a magnetic piston position monitoring system. This therefore allows the usual and economical manufacture of the accumulator, the wall of the cylinder being made of a metal able to withstand a high working load. A minimum of only one of the cylinder closures, closure 3 in the case shown, is made of a non-magnetic metal and a switch with flexible blades, such as an ILS, and housed in a sealed capsule is fitted in a blind hole 27 bored in closure 3 and opening outside the cylinder. The switch 29 can be held in position in hole 27 by securing device 31 or with adhesive. It is known that these switches can be operated remotely by a magnetic flux such as is produced by a permanent magnet.

A permanent magnet 33 is fitted inside the gas chamber 9 and is movable as a function of the movements of piston 7 and able to approach switch 29 to alter its condition when piston 7 approaches closer to closure 3 than a pre-determined minimum distance.

In the sample arrangement shown on FIG. 1, the connecting means fitted between magnet 33 and piston 17 comprises of a telescopic link, one component 35 of which is integral with piston 7 whilst the other component or rod 37 holds magnet 33 at its end; a spring 39 normally maintains the telescopic link in the extended position.

The output terminals 41-43 of switch 29 are connected to an electrical circuit 45 which incorporates indicating or warning components (a lamp L for instance) and/or monitoring components C which can control a safety operation automatically.

If a loss of pre-inflation pressure occurs during the operation of the accumulator; that is to say, there occurs a leakage of the gas under pressure contained in chamber 9, piston 7 will come nearer the closure 3 whenever pump P replenishes the fluid in compartment 11 (assuming that the temperature remains constant).

If the closing movement is such that the magnet 33 comes in the vicinity of the switch 29 and, more specifically, such that magnet 33 comes into contact with the closure 3, the flux of the magnet 33 will travel through the non-magnetic metal of the closure 3 up to the switch 33 which will close the electrical circuit 45.

A warning is then given automatically of the fact that the reserve of gas has become insufficient and that it is necessary to reinflate the accumulator with gas through the filler valve 25.

It can be seen therefore that this automatic accumulator condition monitoring device is achieved without the need for any additional sealing and without increasing the overall dimensions of the device since all the components are housed either within the thickness of the closure or inside the cylinder itself.

The non-magnetic closure 3 can be made of alumunium or copper alloy or of stainless steel.

With this invention, the device allows a periodic or permanent check of the state of the accumulator to be made.

In order to obtain periodic checks, it is only necessary to provide a manually operated switch 47 in circuit 45. After closing this switch, the pump P which replenishes the accumulator up to the maximum pressure allowed is started and a check is made that the warning generated by ILS switch 29 is not given. If necessary, a temperature correction scale would allow more specific information of the state of the gas reserve.

For permanent monitoring, it is only necessary to maintain switch 47 in the closed position. In the case of installations operating without permanent human supervision, a self-recording system can be provided for the warning indication showing that, at least once during the period unsupervised by a person, the accumulator piston has passed the maximum point selected.

Figure 2:
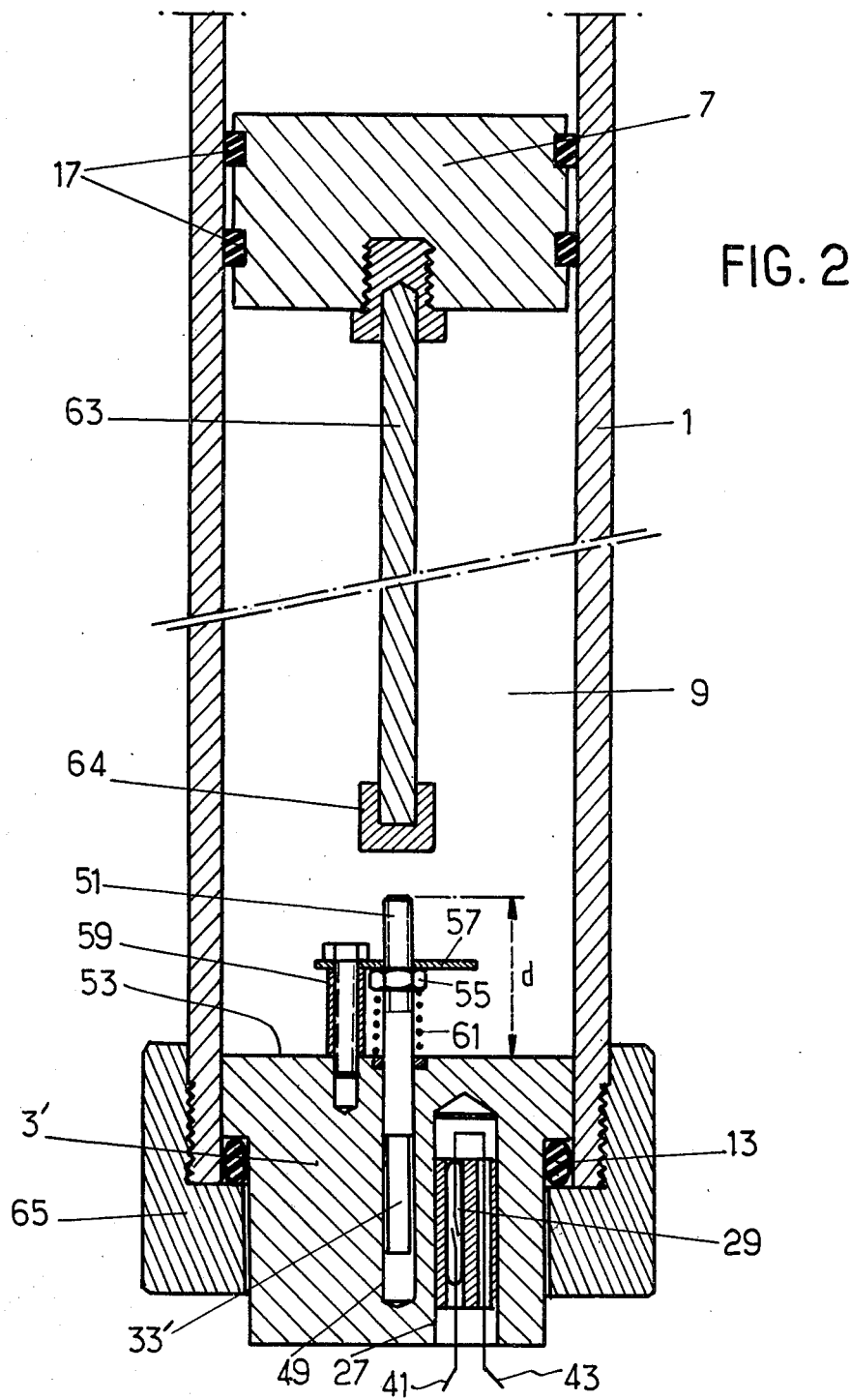
FIG. 2 is a partial sectional view of a preferred alternative structure of implementing the invention.

In the alternative arrangement shown in FIG. 2 a moving magnet 33' is fitted in a second blind hole 49 made in the non-magnetic closure 3' of the accumulator, in the vicinity of the first blind hole 27 containing ILS switch 29. Whereas the first blind hole 27 opens to the outside of the cylinder, the second blind hole 49 opens into accumulator chamber 9 so that, again, no additional sealing is required.

Magnet 33' which can slide in hole 49 is secured with an adhesive, for instance, to push rod 51, which protrudes by a predetermined and adjustable length $d$, beyond the surface 53 of the closure. Adjustment is effected by means of a nut 55, screwed on the threaded end of the rod 51, which bears on a guide and stop plate 57 secured to closure 3', by any suitable means, such as one or several screws 59. The rod 51 and the magnet 33' are impelled by a spring 61 towards the extended position (FIG. 2) in which the magnet does not influence the ILS switch 29.

In this arrangement, the connection between the piston 7 and the magnet 33' is a compression link which includes a rod 63 attached to the piston. The free end of rod 63, which bears against the push rod 51 when the piston protrudes towards the maximum or extended position, preferably supports a thimble 64, the latter having a diameter greater than that of the rod's so as to obviate any risk of misalignment.

In the arrangement in FIG. 2 the closure 3' is a pressure plate held by a ring 65 screwed on the cylinder 1, seal 13 ensuring the sealing of the plate.

This method of construction is of special advantage as, in this case, the pressure plate 3' operates essentially under a compression load and does not require a greater thickness, even though it is made of a non-magnetic metal. The ring 65 can be made of steel without disadvantage.

When the piston 7 descends beyond a predetermined limit laid down, the thimble 64 bears on the push rod 51 pushing it downwardly causing the magnet 33' to move downwardly into the blind hole 49. As, the magnet approaches the ILS switch, its flux, flowing through the non-magnetic metal separating the two blind holes, causes the switch to close and the triggering of a warning or automatic safety device.

In the two arrangements described above the detection of the loss of pre-inflation pressure resulting from a slow leak will allow the accumulator to be re-inflated or the leak to be repaired. In the case of a severe gas leak, the piston 7 would of course be forced beyond the maximum position selected and the fluid pressure acting on the piston would result in the retraction of the connecting components (telescopic system 35–37 in FIG. 1 or rods 63–64 in FIG. 2) fitted between the piston and the magnet. However, there would be no disadvantage in this; as in the case of a severe or sudden leak the accumulator must be replaced or repaired.

As has been seen above, the invention allows the position of the free piston inside the cylinder to be detected; that is to say, both as regards the closure of the gas chamber and the fluid chamber closure. In addition, the detection device itself (ILS switch and movable magnet) can be located on one side or the other of the free piston. The device can be used for instance to check the amount of fluid remaining and to operate the starting of the fluid replenishment pump according to this amount and not according to the pressure.

Figure 3:
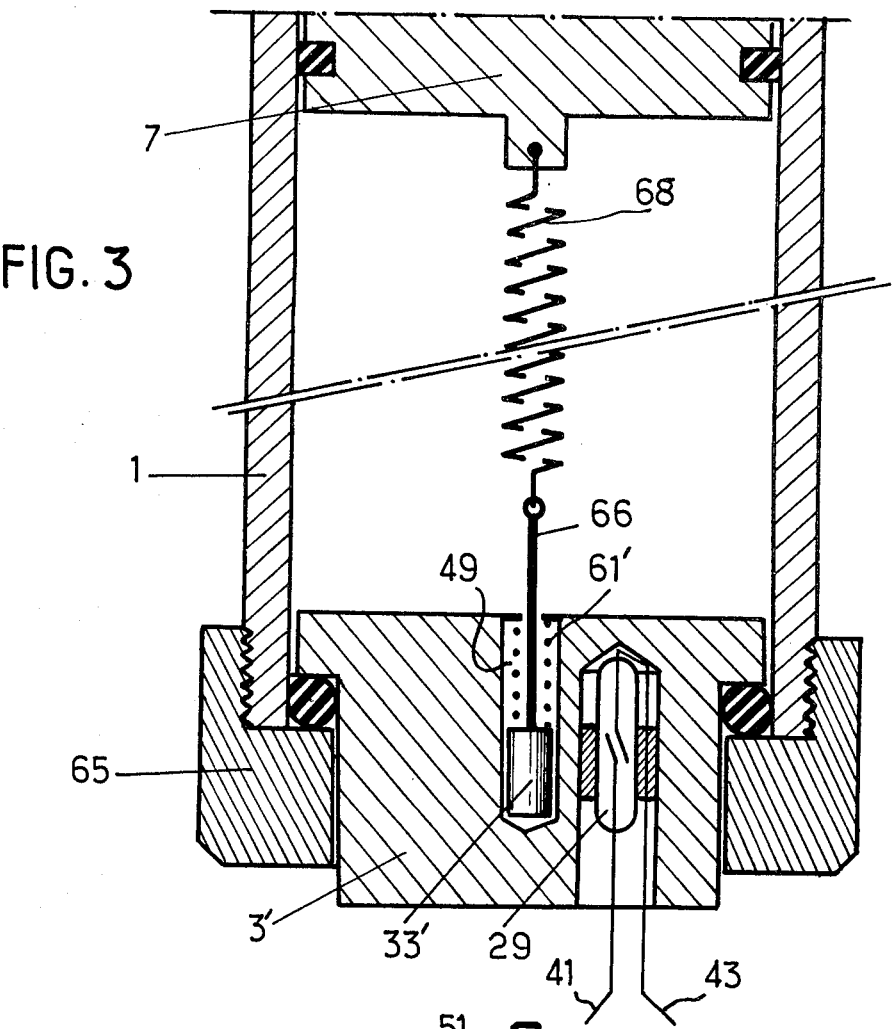
FIGS. 3 and 4 are two partial sectional views of two other alternatives of the invention.

The arrangement shown on FIG. 3 differs from the previous arrangements in that the connecting device fitted between the piston and the magnet operate under tension instead of under compression.

In the embodiment of FIG. 3, the magnet 33' is fitted so as to slide in a blind hole 49 but it is impelled by a spring 61' towards its low position; that is to say to the position in which it operates the ILS switch 49. The connection between the magnet 33' and the piston 7 is provided by a rod 66, on which is attached a tension spring 68, stronger than spring 61', which is itself attached to piston 7.

As long as the piston 7 remains further from the non-magnetic closure 3' than the pre-determined distance selected, the spring 68 is under tension and overcomes the action of spring 61' to retain the magnet 33' in a position in which it does not operate the switch 29. When the piston moves too near closure 31', the spring 68 relaxes its tension and allows the magnet 33' (FIG. 3) to descend towards the position in which it operates the switch. Of course, and as in the case in FIG. 2, adjustment devices (not shown) are provided on the connection so that the triggering occurs at the extreme piston position selected.

In some applications, it may be advantageous to set off an alarm or warning as soon as the piston reaches the position selected (as described above) and also to initiate a safety operation automatically if the piston exceeds by a pre-determined distance the position selected.

Figure 4:
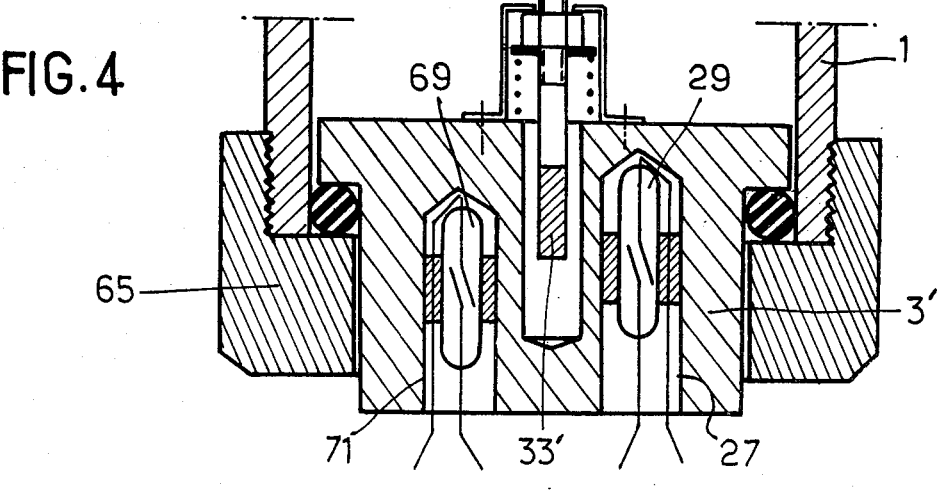

A device fulfilling this function is shown in FIG. 4, which is identical with FIG. 2 except that, in addition to the ILS switch 29 housed in the blind hole 27 in the non-magnetic closure, a second ILS switch 69 is provided, which may be housed in a third blind hole 71 provided in closure 3'.

The two ILS switches are arranged so that the magnet 33' first closes a warning or alarm circuit. Then, if the magnet continues its movement, it will act on the switch 69 to close an automatic safety circuit (not shown).

Thus, when the invention is embodied in an accumulator forming part of a hydraulic circuit-breaker control installation, the closing of the above automatic safety circuit can have the effect of triggering the circuit-breaker automatically or of setting off a system, preventing certain operations.

What I claim is:

1. Apparatus for revealing that a piston has achieved a predetermined position within a pressurized cylinder without requiring an opening in the cylinder which must be separately sealed, comprising a cylinder,
    a non-magnetic end closure operatively and sealingly attached to said cylinder and having
        an aperture therein extending from the exterior surface of said end closure to a location intermediate the exterior and interior surfaces thereof,
    a magnetically operable switch means located in said aperture,
    means within said cylinder and operatively connected to a piston, within said cylinder, for movement therewith for actuation of said switch means when said piston is moved to a predetermind position relative to said end closure.

2. The apparatus of claim 1 wherein
    said actuation means comprises
        telescoping means attached to said piston within said cylinder including
            means for urging a portion of said telescoping means away from said piston and toward said switch means and
            magnetic actuation means operatively connected to said portion of said telescoping means.

3. The apparatus of claim 1 wherein
    said actuation means comprises a second aperture in said end closure extending from the interior surface thereof to a location intermediate the interior and exterior surfaces thereof, said first and second apertures being parallel and without intercommunication, and each extending more than half way through said end closure,
        magnet means movably mounted in said second aperture, means for biasing said magnet means toward a first switch-control position, and means attached to said piston for movement of said magnet, against the force of said biasing means, to a second switch-control position.

4. The apparatus of claim 3 wherein
said means attached to said piston comprises
spring means which act against the force of said biasing means to move said magnet means to said second switch-control position.

5. The apparatus of claim 3 wherein
said means attached to said piston comprises
rod means which act against the force of said biasing means to push said magnet means to said second switch-control position.

6. The apparatus of claim 1 including
means for adjusting said actuation means to predetermine the selected position thereof relative to said end closure at which said switch means will be actuated.

7. The apparatus of claim 1 including
a second aperture in said end closure extending from the exterior surface thereof to a location intermediate the exterior and interior surfaces thereof,
a second magnetically operable switch means located in said second aperture, said second switch means axially spaced from said first switch means and more remote from the interior surface of said end closure than said first switch means, each of said switch means being actuatable by said actuation means in response to different predetermined positions thereof relative to said end closure.

8. An hydropneumatic accumulator comprising
a cylinder having
closures at the opposite ends thereof, at least one of which is constructed of non-magnetic material,
a free piston slidable within said cylinder and forming, between said piston and said closures, two chambers of variable volume,
gas check valve means in one of said closures permitting introduction of gas under pressure into its adjacent chamber,
coupling means in the other of said closures for connecting its adjacent chamber to an hydraulic system,
recess means formed in said at least one non-magnetic closure in the side thereof opposite its adjacent chamber,
magnetically operable switch means for controlling an electrical circuit fixed in said recess,
magnet means, and
actuator means, for moving said magnet means relative to an operative position in which said magnet means is effective to actuate said switch means from the inside of said cylinder, located within said cylinder and operatively connected to said piston in such a manner as to move said magnet means into its operative position when said piston moves past a predetermined position relative to said at least one non-magnetic closure.

9. The accumulator of claim 8 in which
said actuator means comprises
a tubular member projecting from said piston in the direction of said at least one non-magnetic closure,
rod means telescopically slidable in said tubular member including
means for prohibiting removal of said rod means from said tubular member, and
means within said tubular member for urging said rod means toward full extension from said tubular member, and
means on said rod means for mounting said switch means near the end of said rod means most distant from said urging means.

10. The accumulator of claim 8 wherein
said at least one non-magnetic closure includes
a blind bore open to the side thereof at its adjacent chamber, and wherein
said actuator means comprises
first rod means projecting from said piston in the direction of said at least one non-magnetic closure,
second rod means having
a first portion slidable in said blind bore,
a second portion extending toward said piston for engagement with the free end of said first stem,
means for mounting said magnet means near the free end of said first portion for movement therewith relative to the operative position of said magnet means, and
adjustable stop means mounted on said second portion for limiting the travel of said second rod means relative to said blind bore,
stationary stop means mounted in the chamber adjacent said at least one non-magnetic closure for cooperation with said adjustable stop means, and
means for urging said second rod means to a position in which said adjustable and stationary stop means are in a cooperative relationship to prohibit further movement of said second rod means toward said piston.

11. The accumulator of claim 8 wherein
said at least one non-magnetic closure includes
a blind bore open to the side thereof at its adjacent chamber, and wherein
said actuator means comprises
rod means slidably mounted in said blind bore and having
means for mounting said magnet means near one end of said rod means for movement therewith relative to the operative position of said magnet means,
first means for urging said rod means and said magnet means toward the operative position of the latter, and
second means, interconnecting said rod means and said piston, for urging said rod means and said magnet means away from the operative position of the latter.

12. The accumulator of claim 8 including
an electrical circuit for warning of the lack of gas in one of the chambers, and
means operatively interconnecting said switch means to said electrical circuit.

13. The accumulator of claim 8 including
an electrical circuit for starting a pump to replenish the hydraulic fluid in one of the chambers, and
means operatively interconnecting said switch means to said electrical circuit.

* * * * *